Figure 1:
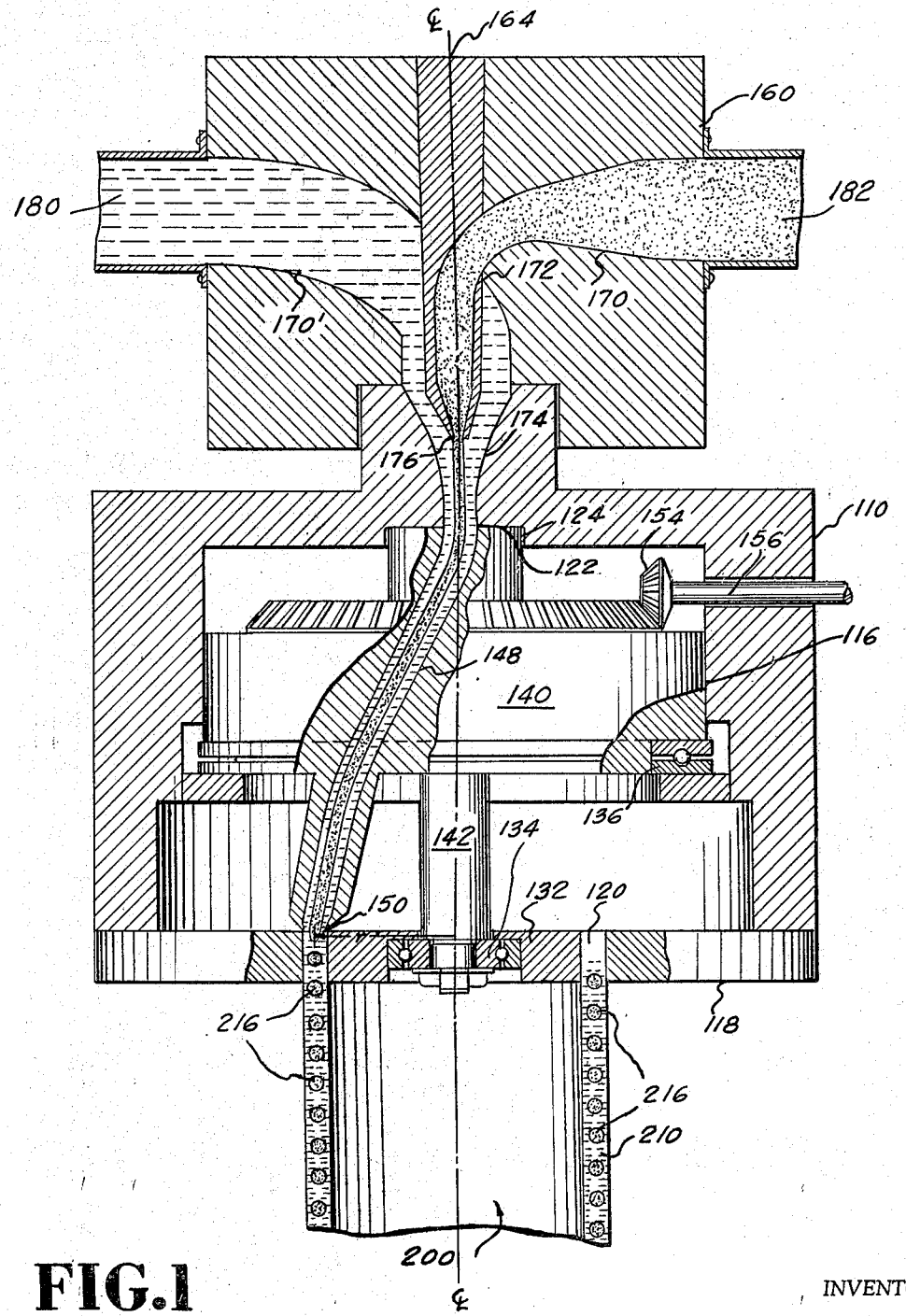

United States Patent Office 3,290,727
Patented Dec. 13, 1966

3,290,727
APPARATUS FOR FORMING COMPOSITE ELEMENTS
Aristovoulos George Petzetakis, Thessalonikis and Chandri Sts., Moscaton, Piraeus, Greece
Filed Aug. 29, 1962, Ser. No. 220,291
Claims priority, application Greece, Sept. 5, 1961, 24,307, Patent 22,347
4 Claims. (Cl. 18—13)

This patent application is based upon Greece patent application Serial No. 22,347, filed September 5, 1961, entitled New Method for the Production of Plastic Hoses.

The present invention relates to means for the manufacture of reinforced seamless rigid or flexible tubing, adapted to withstand an internal pressure or vacuum. As the description herein progresses it will be apparent that any readily extrudable supply material such as synthetic resin and the like, can be utilized in apparatus embodying the present invention. As used herein the term "synthetic resin material," embraces the use of any thermoplastic or thermosetting materials or mixtures thereof. In addition the present invention contemplates within its scope the utilization of natural and synthetic rubbers and their mixtures with synthetic resins.

More especially, the present invention comprises means for the manufacture of hose comprising two plastic or readily extrudable materials compatible with each other wherein helical reinforcement is included in a matrix of softer material. While as aforementioned any plastic or readily extrudable materials which are compatible with one another can be utilized in the apparatus of the present invention, thermoplastic materials are preferably employed. Generally, the embodiment of the present invention disclosed herein comprises means for continuously forming a composite strip comprising a relatively strong reinforcing core material embedded in and fused or bonded to a relatively soft matrix material and continuously fabricating therefrom a tubular structure in which said core material provides an integral helical or spiral reinforcement of the tubular wall formed by said matrix material.

Accordingly, it is an object of the present invention to provide means for forming seamless tubing having integral reinforcement to provide maximum mechanical strength by effecting a substantially perfect bond between the matrix and reinforcement of the tubing.

It is a further objective of invention to provide means for the manufacture of reinforced seamless tubing having any desired flexibility or rigidity with optimum resistance to radial pressures without impairing the axial strength thereof and without impeding the flow of matter through said tubing and wherein the reinforcing material replaces an equal quantity of the softer material in the wall of the tubing, so that the total quantity of material used for the production of the reinforced tubing does not exceed that which would be required for the production of a non-reinforced tubing. This objective is obtained by creating maximum bursting resistance with minimum material.

It is a further objective of the invention to provide a novel means for the economic bonding of thermoplastic materials of differing hardness and other physical characteristics and to distribute them in the proper way for building the wall of a reinforced tubing.

In the drawings:

FIG. 1 comprises a vertical sectional view of an apparatus embodying the present invention.

FIGS. 2, 3, 4 and 5 are sections of various tubings manufactured by the apparatus shown in FIGURE 1.

Broadly, the invention comprises initially uniting plastic materials of different hardness characteristics in a common channel in which a plastic core comprising the harder material is embedded in a more ductile, softer matrix to form a supply of effluent of uniform width in the form of a strip, with a reinforced or wick-like center which is deposited upon itself. The respective plastic materials forming the matrix and the core are simultaneously extruded through a fixed head and thereupon conducted to a bonding station concentrically of each other all under great extrusion pressure and consequent heat. In the process, the combined matrix and its core are bonded, and thereafter rotated in a path of deviation from the initial direction of flow (central line), through a rotating head which is in substantial continuous contact with the fixed channel through which the respective matrix and reinforcing core had passed and were joined. The effect of this rotation is to form a substantially circular track for lapped deposition of the combined materials by ejection of the same from a nozzle through dies, wherein by compression of the ejected and combined matrix and its core, helices are formed between contiguous sides of the matrix whereby because of the malleability or soft plastic condition of the softer matrix an endless tubing is created. It is inherent in the aforementioned process that the softer plastic material forming the matrix is in a molten condition relative to the harder core within the matrix comprising the spiral reinforcement. In fact, the bonded materials are forced under continuous pressure through dies in a winding fashion. This combined winding extrusion through a guide causes the formation of a flowing strip, which winds, continuously upon itself. The spirals of the winding deposit retaining the heat of pressure remain soft; they overlap and fuse together forming thereby a continuous seamless wall in which is embedded the reinforcement. The tubing thus formed is of circular cross-section, having a spiral core, the latter providing controlled reinforcement.

In other words according to the present invention a hollow tube of synthetic resin material is made by continuously extruding a core of a first material having a comparatively high mechanical strength, simultaneously extruding a second material which is comparatively soft and plastic around the first material, subjecting the materials to sufficient pressure to form a firm bond between them, pushing the materials through a rotating nozzle, and winding the emerging material on itself in a guide so that the softer material fuses to form a continuous hollow tube incorporating a spiral core of the stronger material.

It should be apparent that utilizing apparatus embodying the present invention the two materials, which are of different hardness and plasticity, are strongly bonded together in the initial phase of the process under high pressure and temperature, while at the last phase of the process only the sealing of the homogeneous and soft covering material is involved, which is easily achieved by insignificant pressure.

The covering of the hard core with the softer material at the initial phase of the process aims also at facilitating the passage of the harder core through the narrow channels, since the softer material is interposed between the hard core and the metallic inner surfaces of the channels and acts as a lubricant conveying with it the hard core. This makes it possible for the strengthening spiral core to be made of very hard materials which are normally very difficult to extrude. Also, by elongating the narrow channel in the rotating head and by adjusting the corresponding displacement of the nozzle to various distances from its axis of rotation, tubes of different and very large diameters can be obtained.

A particular advantage of the present invention resides in the provision for regular and continuous flow of the extruded mass through the extrusion head. This is achieved by means of the passage of the combined matrix and core through a fairly narrow "lubricated" channel up to the die. In the art, extrusion methods heretofore employed call for irregular flow of the mass into the head resulting in the presence of joining lines along the formed tubular element, caused by supports such as spiders and the like. This latter mentioned difficulty of the prior art is an especially significant detriment to the manufacture of tubes of large diameter. The invention, then lends itself readily to the fabrication of tubes of unusually great diameters without the well-known difficulties in the extrusion technique.

In practice, the two materials, after having been bonded in the form of a cord, run at the same linear speed through the common channel. It will be apparent, however, that should the rate of turn of either the extruder screw, or the feeding of the respective channels be varied, the quantitative relation of the one material to the other would be affected. Since both materials when joined pass simultaneously through a channel of a given diameter, the diameter of the rigid spiral would thus increase or decrease according to the rate of production of the rigid material in relation to the rate of production of the softer material comprising the matrix. This is inherent in the process. The diameter, therefore, of the reinforcing material is directly proportionate to its rate of production as related to that of the softer material. In practice also, the rotational speed of the extrusion head, while variable, should be such that the circumferential velocity of the extrusion nozzle which is adjacent to the die is substantially equal to the linear velocity of the strip of the combined material which is extruded through the nozzle.

Owing to the fact that the axes of both channels in the fixed and the rotating heads at their joining point coincide with the axis of rotation, it is evident that the material, in the form of the said cord, when entering the channel of the rotating head, will, in addition to its linear movement, also suffer a twisting action around its own axis at the rate of one turn for every complete revolution of the rotating head. Since the materials are in a plastic condition, such twisting has no significance. However, it is obvious that in order to obtain a tube with a uniform wall it is necessary that at this joining point of the two heads the materials are found concentrically of each other and are of circular cross-section.

The thickness of the spiral core, its pitch, as well as the thickness of the wall of the tube can be varied according to the specific requirements of the types of tube desired and also the properties of the materials used. According to the elasticity of the softer material tubes of different and very high flexibility can be attained, in which the embedded spiral core of the hard material makes the tube equally strong to withstand high internal pressures or vacuums.

The method of forming this tube, by which the strong core is firmly bonded approximately in the center of the softer wall, provides a tube of great strength using a small quantity of materials. While the reinforcing spiral core increases the resistance of the tube at its circumferential direction (where the greatest forces act), it does not affect (owing to the aforesaid perfect bonding of the two materials) its resistance in its longitudinal direction, and as the spiral core forms an integral part with the wall of the tube, it becomes obvious that by this method, in the last analysis, the tube is reinforced without using more volume of material than that which would be required for the production of a similar (same size) but non-reinforced tube.

In addition it will be apparent to those skilled in the art that a tube, after being manufactured by the present invention, can be further processed, as for instance by coating externally or lining internally the tube with other protective materials, etc.

The fact that the passage of the materials from the fixed head into the rotating head is effected through channels of small circular cross-section eliminates the problems of tightness and friction at the contact of the two heads, although the materials passing through this section are subjected to high pressure. As a result of the above a simple and sturdy construction of the apparatus carrying out this process is possible.

*Apparatus*

The apparatus is designed for the simultaneous extrusion of two separate thermoplastic materials. A fixed head 160 has two inlets 182 and 180. Inlet 182 communicates through the conduit means or channel 170 and its extension 172 in the dowel 164, with the circular section orifice 176 which is in material ejecting communication with the center of a first common channel 174.

Similarly the inlet 180 communicates through the conduit means or channel 170′ with the common channel 174 which is situated in a second fixed member 110. Inside the fixed member 110 is a rotatable member 140 driven by a cooperating toothed wheel 154 which is connected through a shaft 156 to a variable speed motor (not shown). The member 140 is rotatable about the axis CL which, in the embodiment of the invention illustrated, is the central line of the apparatus. This member 140 rests rotationally upon the bearings 124, 116 and 136.

The rotatable member 140 has a conduit means or channel 148 which connects with the channel 174 of the fixed member, so that at their connection point 122 the axis of each channel coincides with the axis of rotation. The two channels must both be of circular cross-section at their connection as they have to be in continuous communication, while the one rotates.

Channel 148 leads to, and is in communication with a nozzle 150 integral with the rotating member 140, which nozzle is displaced a distance $r$ from the axis of rotation, so that as member 140 is rotated the nozzle describes a circular track of radius $r$ around that axis. Corresponding to this circular track is a gap 120 formed between circular dies 118 and 132. The external die 118 is fixed to the member 110, while the internal die 132 is supported by the shaft 142 of the rotating member upon bearing 134.

In operation of the apparatus of the present invention, a mechanically strong material such as rigid PVC (polyvinyl chloride) is forced through inlet 182 and orifice 176 under continuous pressure from an extruder, into the center of a stream of softer material, such as soft plasticized PVC which, having been forced through the inlet 180 and channel 170′, moves along the channel 174. The materials are pushed together through the channel 174 and as they are forced to pass through narrow channels they are subjected to high pressure and are firmly bonded together to form a hard core inseparable, when cooled, from the surrounding layer of softer, more plastic material.

The materials so bonded are forced, under the continuous pressure exerted from the extruders, to pass from the channel 174 of the fixed head to the channel 148 of the rotating head and through the channel 148 where they are led to the nozzle 150 from which they are ejected into gap 120 between the dies 118 and 132 while the nozzle is at the same time rotating.

The correlation between the rotational speed of the nozzle and the extrusion speed of the materials through it is such that the nozzle, during its rotation, deposits continuously on its circular track a strip of material which is wound on itself in spirals, so that the still hot, plastic, surrounding portion of the strip which is formed of the softer material fuses to form a continuous wall without a seam, thus giving a circular section hollow tube 200 whose wall 210 incorporates a strengthening spiral core 216 and which tube is pushed forward by the material ejected continuously from the nozzle.

It will be obvious that by extruding the hard material through the small orifice at 176, an improvement in its physical properties is obtained. A modification to this method will occur to those skilled in the art, whereby a stretching of the comparatively rigid spiral reinforcing material may be effected when using materials that are susceptible to orientation. If the section of the channel through which the combined materials pass is reduced in cross-section as at 148, one diminishes the diameter of the core whereupon by accelerating the speed of the passage of the core through the channel an automatic stretching of the core within the matrix occurs ensuring a relative orientation, if the existing temperatures are the appropriate ones.

A tube of maximum strength is manufactured by apparatus embodying the present invention in a continuous and substantially automatic process using the smallest possible quantity of materials. Due to the bond between the respective matrix and core, it is quite unnecessary for a great thickness of the soft material to surround the core. As previously indicated, the diameter of the reinforcing spiral is directly proportionate to the rate of production of the hard material as related to that of the softer material. In this connection attention is directed to FIGS. 2, 3, 4 and 5 which illustrate samples of tubes which can be produced utilizing apparatus embodying the present invention and using the same dies.

Figure 2:
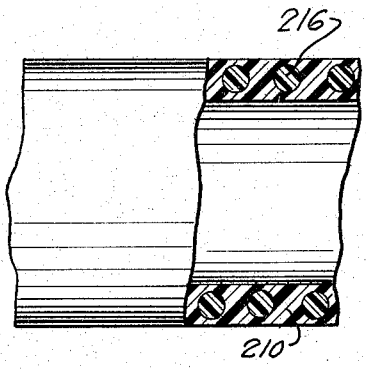

FIG. 2 particularly illustrates a tube reinforced with a spiral of small diameter.

Figure 3:
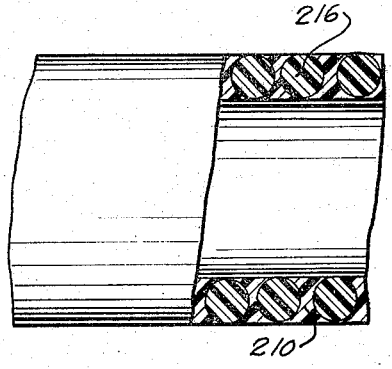

By increasing the rate of extrusion of the hard material and by decreasing at the same time the rate of extrusion of the soft material, the diameter of the reinforcing spiral increases as shown in FIG. 3 in which the diameter of the spiral has attained its maximum, being the thickness of the wall of the tube.

Figure 4:
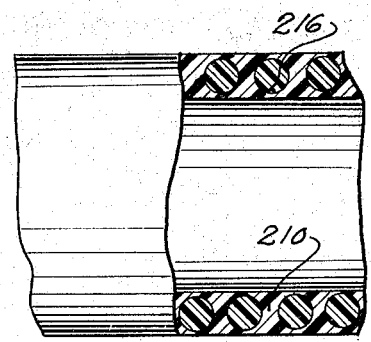

FIG. 4 illustrates a tube with a reinforcing spiral of medium diameter.

Figure 5:
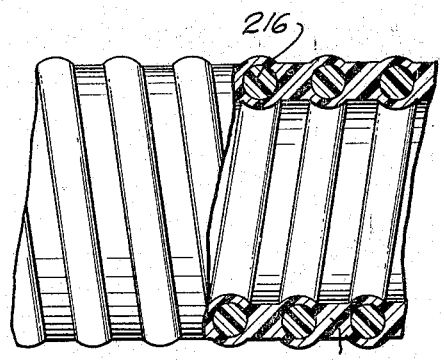

Finally, the tube in FIG. 5 is derived from that illustrated in FIG. 4, when the tube extruded from the apparatus as in FIG. 4 is stretched by the continuous take-off at a high speed before it solidifies by cooling, whereby the tube being stretched becomes thinner at the points 210 of the soft material.

It will thus be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

I claim:
1. A first fluid conduit means having a feed end and a discharge end, a second fluid conduit means having a feed end and a discharge end, the discharge end portion of said first fluid conduit means surrounding the discharge end of said second fluid conduit means, and a third fluid conduit means having a feed end and a discharge end, the feed end of said third fluid conduit means being in fluid communication with the discharge ends of said first and second fluid conduit means and adapted to receive the discharge therefrom, said third fluid conduit means providing a common conduit for receiving said discharge and for discharging the same via the discharge end of said third conduit means, the discharge end of said third fluid conduit means being rotatable with respect to the feed end of said third conduit means.

2. The structure defined in claim 1 wherein the discharge end of said third fluid conduit means is in continuous communication with a cylindrical guide slot defined by the exterior cylindrical surface of a first die means and the radially spaced interior cylindrical surface of a second die means surrounding said first die means.

3. An apparatus for forming a hollow tube having a wall formed of a first plastic matrix material and a reinforcing spiral of a second plastic material embedded therewithin and bonded thereto comprising in combination a first conduit means for said matrix material having an inlet end and a constricted discharge end, a second conduit means for said reinforcing material having an inlet end and a constricted discharge end termination in an extrusion orifice within the discharge end portion of said first conduit means, a third conduit means having an inlet end and a discharge nozzle means, said inlet end of said third conduit means being in fluid communication with the discharge end of said first conduit means and said discharge nozzle means being movable in a predetermined closed path conforming to the cross-sectional configuration of the tube to be formed and a guide means having a slot in communication with said nozzle means throughout its path of movement for continuously receiving the composite extruded material discharged from said nozzle means whereby said composite extruded material will be spirally wound to form said hollow tube.

4. An apparatus for forming a hollow tube having a wall formed of a first plastic matrix material and a reinforcing helix of a second plastic material embedded therewithin and fused thereto comprising in combination: a first conduit means for said matrix material having an inlet end and a constricted discharge end; a second conduit means for said reinforcing material having an inlet end and a constricted discharge end terminating in an extrusion orifice within the discharge end portion of said first conduit means; and a third conduit means having an inlet end and a discharge nozzle means, said inlet end of said third conduit means being in fluid communication with the discharge end of said first conduit means and said discharge nozzle means being rotatable so as to discharge therefrom the composite extruded material in a spiral manner to a guide means wherein the said plastic matrix material fuses to form the said wall of said hollow tube.

References Cited by the Examiner

UNITED STATES PATENTS

| Re. 24,468 | 5/1958 | Roberts | 138—122 |
|---|---|---|---|
| 2,576,444 | 11/1951 | Clinefelter | 18—13 |
| 2,671,939 | 3/1954 | Everhart et al. | |
| 2,687,553 | 8/1954 | Colombo | 18—13 |
| 2,722,263 | 11/1954 | Blare et al. | |
| 2,730,761 | 1/1956 | Castellan | 18—13 |
| 2,809,393 | 10/1957 | Hauptman | 18—13 |
| 2,878,514 | 3/1959 | Nichols et al. | |
| 2,957,201 | 10/1960 | Fields et al. | 18—13 |
| 3,015,133 | 1/1962 | Nichols | 264—173 |
| 3,047,026 | 7/1962 | Kahn | 138—122 |
| 3,051,995 | 9/1962 | Ferrell et al. | 264—173 |

FOREIGN PATENTS 626,945   7/1949   Great Britain.

J. SPENCER OVERHOLSER, *Primary Examiner.*

ROBERT F. WHITE, EDWARD V. BENHAM, WILLIAM J. STEPHENSON, *Examiners.*

M. H. ROSEN, L. G. FOSTER, L. S. SQUIRES,
*Assistant Examiners.*